United States Patent
Bott

[11] 3,856,193
[45] Dec. 24, 1974

[54] AUTOMOBILE WIND DEFLECTOR ASSEMBLY

[76] Inventor: John A. Bott, 931 Lake Shore Dr., Grosse Pointe Shores, Mich. 48236

[22] Filed: Sept. 5, 1972

[21] Appl. No.: 286,572

Related U.S. Application Data

[63] Continuation-in-part of Ser. No. 106,803, Jan. 15, 1971, abandoned.

[52] U.S. Cl. .............................. 224/42.1 D, 296/91
[51] Int. Cl. .............................................. B60n 9/04
[58] Field of Search ..... 224/42.1 D, 42.1 F, 42.1 R, 224/42.1 F, 42.1 G; 296/1 S, 91, 84 H, 86, 296/87, 88

[56] References Cited
UNITED STATES PATENTS

| | | | |
|---|---|---|---|
| 2,499,136 | 2/1950 | Edlund et al. | 296/85 |
| 3,090,645 | 5/1963 | Shumaker | 296/91 |
| 3,223,301 | 12/1965 | Helm | 224/42.1 D |
| 3,330,454 | 7/1967 | Bott | 224/42 IE |
| 3,368,841 | 2/1968 | Grau | 296/91 |
| 3,519,178 | 7/1970 | Helm et al. | 224/42.1 R |

Primary Examiner—Robert G. Sheridan
Assistant Examiner—Jerold M. Forsberg
Attorney, Agent, or Firm—Harness, Dickey & Pierce

[57] ABSTRACT

A wind deflector for station wagons and similar automotive vehicles. The wind deflector includes an extruded aluminum blade having its opposite ends received in the sockets of a pair of stanchions or supports. In one form of the invention the wind deflector forms a part of a luggage rack with the rear ends of luggage rack side rails being supported on the wind deflector assembly.

7 Claims, 9 Drawing Figures

PATENTED DEC 24 1974 3,856,193

INVENTOR.
John A. Bott
BY
Harness, Dickey & Pierce
ATTORNEYS.

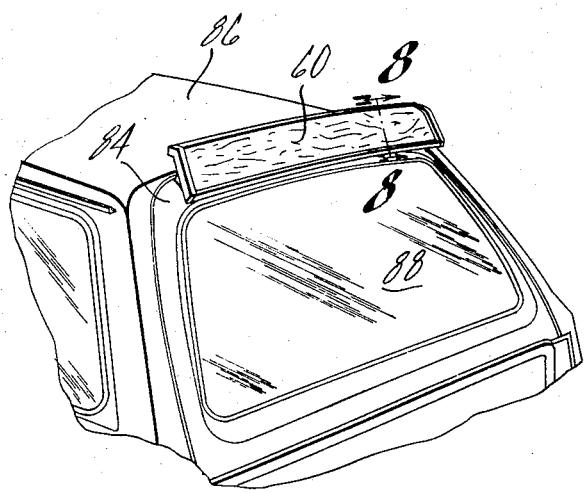
FIG. 7.
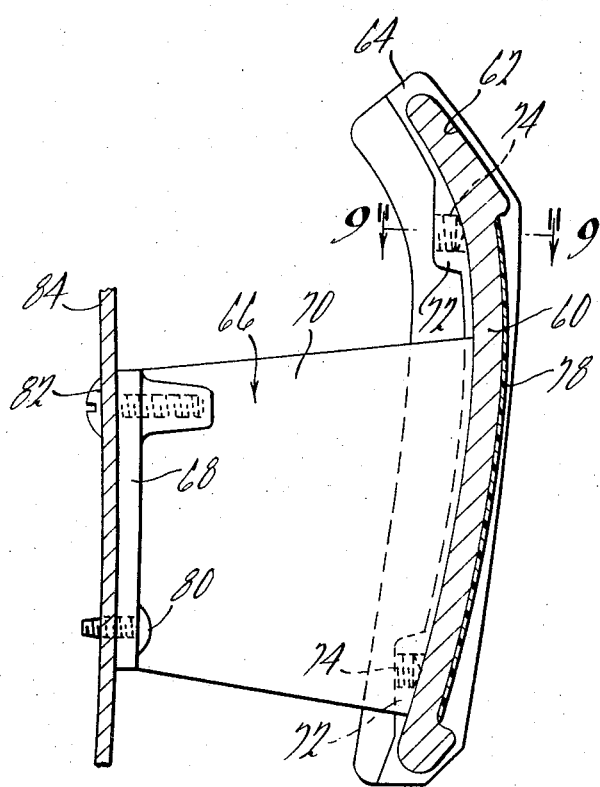
FIG. 8.
FIG. 9.

3,856,193

AUTOMOBILE WIND DEFLECTOR ASSEMBLY

RELATED APPLICATION

This application is a continuation-in-part of my co-pending application Ser. No. 106,803, Filed Jan. 15, 1971 now abandoned.

SUMMARY OF THE INVENTION

Wind deflectors have been utilized in recent years for directing air over the rear window of a moving vehicle. When a vehicle rear window is immediately adjacent the rear end of the vehicle and has a substantial vertical orientation it tends to accumulate road dust and dirt. The wind deflector directs air across the window to keep the window much cleaner than would otherwise be the case. The wind deflector of the present invention is characterized by the use of supports or stanchions which have sockets receiving the opposite ends of the wind deflector. Setscrews or the like are provided to secure the ends of the wind deflector in the sockets and these setscrews are accessible from the inner sides of the stanchions or supports, thereby leaving the outer surface of the wind deflector blade unobstructed by fasteners or the like. The luggage rack is particularly attractive in appearance, any rough edges at the ends of the blade being covered by the supports. The blade presents an uninterrupted outer surface which is not marred by fastener heads or the like.

One form of the invention utilizes the wind deflector as the rear portion of a luggage rack with the side rails of the luggage rack being supported on the wind deflector assembly. This eliminates the need for a separate rear cross rail and separate rear supports for both the luggage rack and wind deflector. This form of the invention is distinguished by its economy in number of parts and its simplicity of design.

It is an object of the present invention to provide a wind deflector and a combination luggage rack and wind deflector assembly which may be manufactured at a reasonable cost, which are rugged and durable in construction, attractive in appearance, durable and reliable in the performance of their intended functions.

DESCRIPTION OF THE VIEWS OF THE DRAWINGS

FIG. 7 is a fragmentary perspective view of an automobile having mounted thereon a modified form of wind deflector cnstructed in accordance with the present invention;

FIG. 8 is an enlarged sectional view of the structure illustrated in FIG. 7 taken along the line 8—8 thereof; and FIG. 9 is a sectional view of the structure illustrated in FIG. 8 taken along the line 9—9 thereof.

DESCRIPTION OF THE PREFERRED EMBODIMENTS OF THE INVENTION

Figure 1:
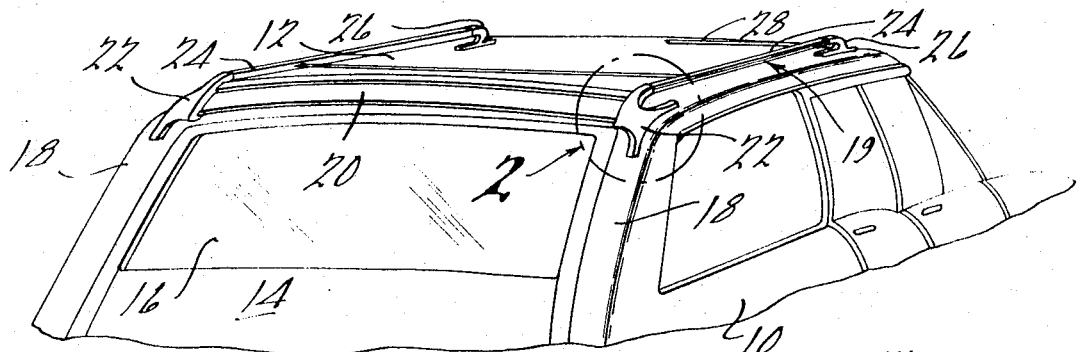
FIG. 1 is a fragmentary perspective view of an automobile having mounted thereon a combination luggage rack and wind deflector constructed in accordance with the present invention.
Figure 5:
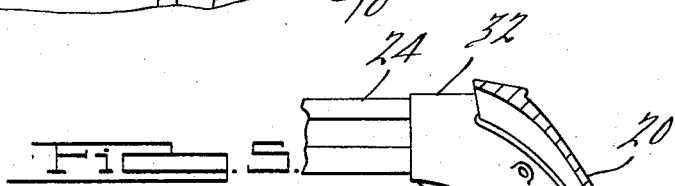
FIGS. 3, 4 and 5 are enlarged sectional views of the structure illustrated in FIG. 2 taken, respectively, along the lines 3—3, 4—4 and 5—5 thereof.
Figure 3:
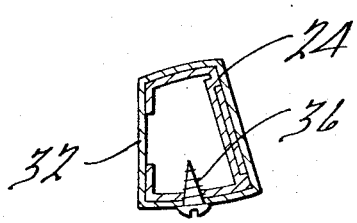
Figure 4:
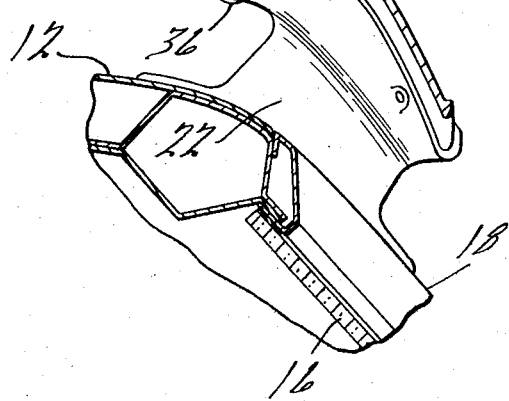
Figure 2:
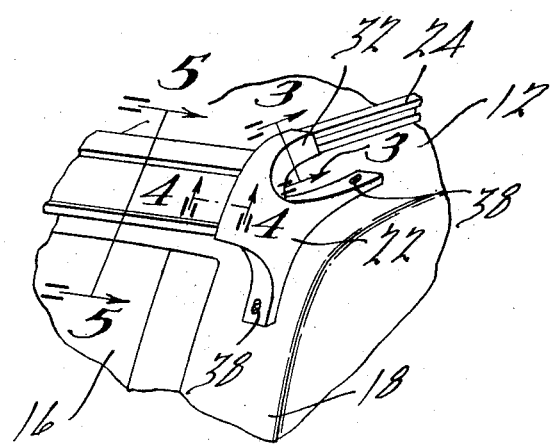
FIG. 2 is an enlarged perspective view of the structure enclosed within the circle 2 of FIG. 1.

Referring now to FIG. 1, a station wagon body 10 is illustrated as having a roof panel 12, a tail gate 14 and a rear tail gate window 16. As used herein the expression "roof" is intended to refer, not only to the horizontal upper portion of the body 10 but also to the portions of the body immediately adjacent thereto. Accordingly, the portions of the body illustrated at 18 are intended to be included within the scope of the word "roof". A device of the present invention is shown at 19 mounted on the roof 12. The device 19 includes a wind deflector assembly comprising a wind deflector blade 20 and a pair of rear stanchions 22. The wind deflector assembly 20, 22 forms the rear portion of an enclosure which also includes a pair of longitudinally extending side rails 24, a pair of front stanchions 26 and a front cross member 28. The front cross member 28 extends between and is supported by the front stanchions 26. The front ends of the side rails 24 are also supported by the stanchions 26 while the rear ends of the side rails 24 are received in and supported by the rear stanchions 22. Thus, the front cross member 28, wind deflector 20 and side rails 24 define a rectangular enclosure raised slightly above the roof 12.

Referring now to FIGS. 2 through 5, it will be seen that opposite end portions 29 of the blade 20 are received within sockets 30 cast into the rear stanchions 22. The castings 22 are also provided with socket portions 32 which telescopically receive the rear ends of the side rails 24. The rear ends of the side rails 24 are held in the socket portions 32 by screws 36. From FIG. 5 it will be apparent that the blade 20 is held by the stanchions 22 in an angular relation to a horizontal plane. In this attitude the blade 20 is able to deflect air moving relatively over the top of the roof 12 and cause such air to flow downwardly over the window 16. As is well known to automotive designers, station wagon rear windows tend to accumulate road dust more readily than the rear windows of conventional passenger cars. The squared off rear end of a station wagon creates a vacuum behind the window 16 which draws road dust onto the window 16. The downward movement of air over the window 16 which is created by the deflector blade 20 tends to eliminate this vacuum and prevent the build up of dust on the window 16.

It will be noted that the rear stanchions 22 are held on the roof 12 and its portion 18 by fasteners 38 in the form of sheet metal screws. The fasteners 38 secure the stanchions 22 on the roof 12 with sufficient strength to restrain rearward movement of luggage or other objects positioned within the luggage rack enclosure. It should be noted that an upper edge 40 of the blade 20 is positioned above the horizontal plane of the roof 12 where it will abut luggage tending to slip rearwardly off of the roof 12. The socket 30 of the rear stanchions 22 is contoured to fit the cross sectional shape of the blade 20 and fasteners 42 hold the end portions 29 of the blade 20 within the sockets 30.

Figure 6:
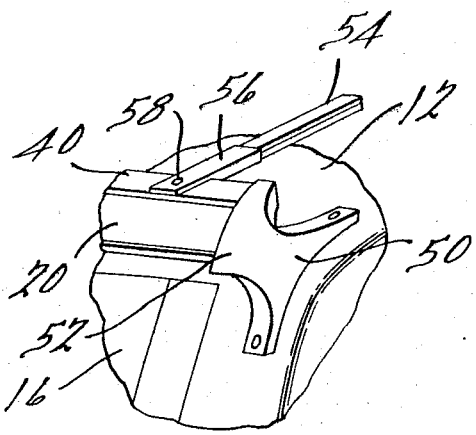
FIG. 6 is a view of a structure similarly illustrated in FIG. 2 showing a modified form of the invention.

A somewhat modified form of the invention is illustrated in FIG. 6 which illustrates a rear stanchion 50 positioned on the roof 12. One end of the wind deflector blade 20 is shown fitted within a socket portion 52 of the rear stanchion 50. The construction of FIG. 6 differs from the prior embodiment in that a side rail 54 is fitted at its rear end with an adaptor 56 conformably engaging the upper surface of the blade portion 40. The adaptor 56 is held to the blade 20 by means of a screw 58. In all other respects the form of the invention of FIG. 6 is the same as the prior form of the invention. In both forms of the invention, the side rails are supported at their rear ends on the wind deflector assembly. In FIG. 6 however the connection is made directly to the blade portion of the wind deflector assembly rather than to the stanchion portion thereof.

FIGS. 7 through 9 illustrate a wind deflector which does not form a portion of a luggage rack. The wind deflector assembly of FIGS. 7 through 9 includes an extruded aluminum blade 60 having its opposite ends received within sockets 62 formed in the socket portions 64 of a pair of supports or brackets 66. The brackets 66 each include a base portion 68 and a wall 70 extending from the base portion 68 to the socket portion 64. The sockets 62 of the two supports 66 face one another and are of a cross sectional shape conforming to the cross sectional shape of the blade 60. Each of the socket portions 64 will be seen to have a boss 72 which is tapped to receive a setscrew 74. The setscrew 74 has a pointed end 76 which digs into the blade 60 when the setscrew is tightened in order to firmly locate the blade 60 and hold it against one wall of the socket 62. Of course, the sockets 62, being closed at their ends, restrain endwise movement of the blade 60. It will be seen that a decorative plastic layer 78 is affixed to the outer surface of the blade 60 while a pair of screws 80 and 82 hold the base portion 68 of each support 66 to a sheet metal tailgate door panel 84. The tailgate door panel 84 forms a part of an automobile body 86 and incorporates a rear window 88 immediately adjacent the rear end of the automobile 86. The blade 60 is oriented to deflect air across the window 88.

The blade 60 is desirably made from an aluminum extrusion which is die formed to give it a longitudinal bow or curvature. It should be noted, however, that it is not necessary to finish the opposite ends of the blade 60 nor to carefully trim the decorative layer 78 inasmuch as the opposite ends of the blade 60 are enclosed within the sockets 62 of the supports 66. Thus the socket portions 64 finish the blade at its opposite ends and minimize manufacturing costs for the blade 60. Furthermore, the supports 66 are very strong and minimize any tendency of the blade to come off the roof.

What is claimed is:

1. A vehicle wind deflector including a blade of substantially uniform cross sectional shape and a pair of supporting brackets, each of said brackets having a socket portion and a base portion adapted to be fastened to a portion of the vehicle body, said socket portion conformably encircling one end of said blade, means on said brackets for securing the ends of said blade in said socket and a fixed elongated wall connecting said base portion and said socket portion which closes the space between said blade and the vehicle body at the opposite ends of said blade, said wind deflector comprises the rear portion of a luggage rack having a pair of opposite side rails with their rear ends supported on said wind deflector so as to be spaced above a roof portion of the automobile, said blade being oriented to deflect ambient air onto the rear window of the vehicle.

2. The structure set forth in claim 1 in which said last named means comprises setscrews having pointed ends engaging said blade.

3. An accessory for an automotive vehicle having a roof and a generally vertically extending rear window adjacent the rear end of said roof, said accessory comprising a wind deflector assembly having a wind deflector blade extending transversely of the vehicle adjacent the upper end of said rear window and a pair of rear stanchions fastened to the roof having socket portions conformably receiving and supporting said blade at the opposite ends thereof, said blade being oriented to deflect ambient air onto said window when the vehicle is driven in a forward direction; front stanchion means fastened to said roof; a front cross member supported by said front stanchion means; and a pair of longitudinally extending side rails supported at their front ends by said front stanchion means and at their rear ends by said wind deflector assembly.

4. The structure set forth in claim 3 in which said rear stanchions have socket portions receiving the rear ends of said side rails.

5. The structure set forth in claim 3 including fastening means connecting said blade and side rails, said fastening means including a threaded fastener engaged in said blade.

6. The structure set forth in claim 3 including an adaptor fitted on the rear end of each of said side rails and a fastener connecting said adaptor and said blade.

7. The structure set forth in claim 3 in which said blade has an upper leading edge portion disposed above the horizontal plane of said roof.

* * * * *